United States Patent [19]
Fries et al.

[11] Patent Number: 5,936,677
[45] Date of Patent: Aug. 10, 1999

[54] MICROBUFFER USED IN SYNCHRONIZATION OF IMAGE DATA

[75] Inventors: Robert M. Fries; Nigel Stuart Keam, both of Redmond, Wash.

[73] Assignee: Microsoft Corporation, Redmond, Wash.

[21] Appl. No.: 08/928,277

[22] Filed: Sep. 12, 1997

[51] Int. Cl.$^6$ ............................................. H04N 5/265
[52] U.S. Cl. ..................... 348/512; 348/565; 348/588
[58] Field of Search .................................. 348/512, 513, 348/510, 10, 563, 564, 565, 566, 567, 568, 569, 584, 588; 358/149, 183; H04N 5/265, 5/45, 5/445

[56] References Cited

U.S. PATENT DOCUMENTS

| | | | |
|---|---|---|---|
| 5,680,178 | 10/1997 | Takeuchi | 348/581 |
| 5,729,300 | 3/1998 | Ahn | 348/564 |
| 5,812,212 | 9/1998 | Hamamatsu et al. | 348/564 |

FOREIGN PATENT DOCUMENTS

| | | | |
|---|---|---|---|
| 1-51774 | 2/1989 | Japan | H04N 5/265 |
| 1-233882 | 9/1989 | Japan | H04N 5/265 |
| 3-59696 | 3/1991 | Japan | 358/149 |

*Primary Examiner*—David E. Harvey
*Attorney, Agent, or Firm*—Ronald M. Anderson

[57] ABSTRACT

For use in a set-top box, a relatively small line buffer and a frequency control permit scaling of a video input signal and synchronization between the input signal and a composite output signal. Image data and timing signals derived from the video signal are applied to a video capture engine (VCE). When scaling the input video, the VCE combines an appropriate number of successive lines of the field being processed to produce scaled scan line data for use by a dynamic composition engine (DCE) in producing the composite image. A video odd timing signal is applied to an input odd register, which is monitored by a central processing unit (CPU). The CPU controls the values in a frequency register and in an output odd register. The value in the frequency register determines the frequency of an output clock. The signal from the output clock is applied to a horizontal timing logic circuit that produces an output horizontal sync signal. By adjusting the values in the frequency register and in the output odd register, the CPU is able to control synchronization of the composite image and to determine whether the scaled video is rapidly synchronized with the input signal or is allowed to synchronize more slowly, after a change occurs in the video source. Preference can thus be given either to the stability of the digital signal portion of the composite image or to the scaled video data.

20 Claims, 14 Drawing Sheets

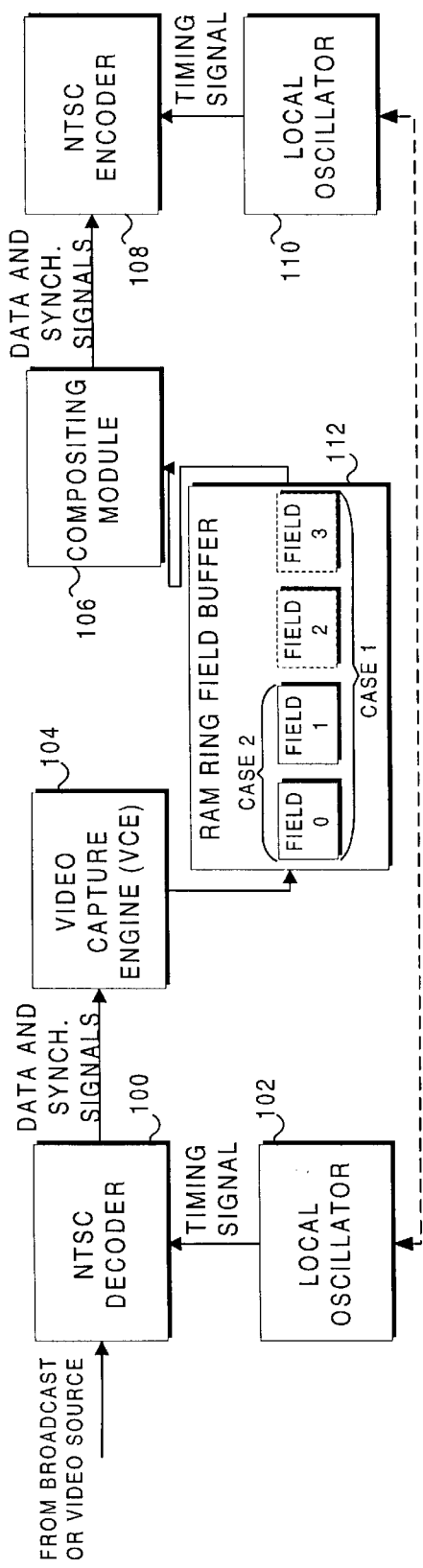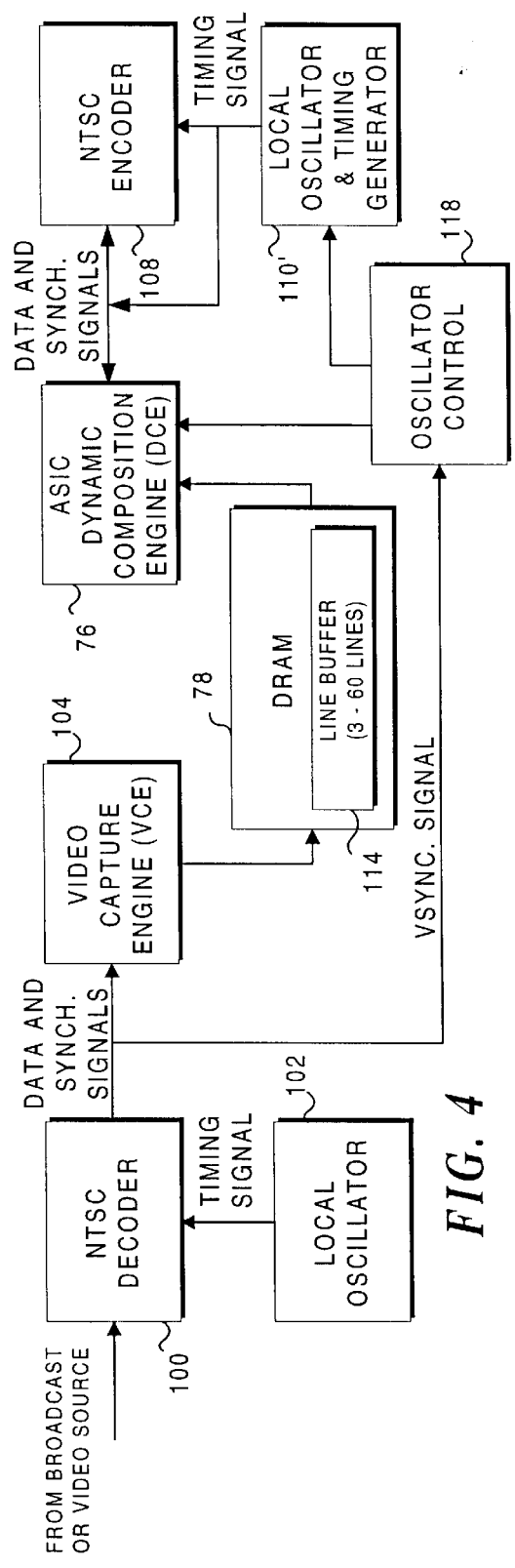
FIG. 3 (PRIOR ART)
FIG. 4

MICROBUFFER USED IN SYNCHRONIZATION OF IMAGE DATA

FIELD OF THE INVENTION

The present invention generally relates to synchronization of a video image, and more specifically, to controlling the synchronization between an input video signal and an output video signal.

BACKGROUND OF THE INVENTION

The relatively wide bandwidth for distributing signals on a cable television network can be used for purposes other than simply distributing broadcast television signals. One of the ideas currently being developed and tested will permit subscribers to interact with a television program that is being viewed. For example, using a remote control as an input device, the subscriber will be able to enter a vote on some issue or current topic. This system will also enable viewers of a show to determine how the plot of the show develops by voting for one of several alternatives. Another use of such a system will be to enable a user to select pay-for-view movies, on demand, for viewing when the subscriber chooses, rather than in accord with a fixed timetable.

An interactive television interface will be required for input of a user selection, since a conventional television does not have the capability to produce a signal for transmission over the cable network to the cable source. Because of its typical position atop a television receiver, such an interface is referred to as a "set-top box."

With the advent of interactive television, it is likely that software application programs will be developed to implement an on-screen graphic interface for prompting input by the viewer. Other types of software applications employing graphic user interfaces might also be run on a set-top box. It is likely that the viewer will be given more control over the nature of the signal displayed on the screen, including the ability to modify the signal or to combine it with other signals such as those generated by a computer or other digital video source in a particular manner. Conventional television receivers do not currently have the capability to combine a broadcast signal from a television network (or the signal from a laser disc player, a digital video/versatile disc (DVD) player, or video recorder) with a digital graphics signal from a computer to produce a composite image that can be displayed on the television screen. To combine such signals, a set-top box will be required that provides for composite display of various video and digital graphic signals having different formats, in an appropriate format for input to the television receiver.

One of the problems that must be addressed by such a set-top box is maintaining synchronization between a broadcast (or other video) signal that is being received and a digital graphic signal being produced by an application program executed within the set-top box or by an attached personal computer. When these two signals are combined to produce an image displayed on the television receiver or video monitor, the appropriate synchronization signals must be provided to maintain horizontal and vertical synchronization of the component images that comprise the composite image, in conformance with the National Television System Committee (NTSC) standard used for television in the U.S. (or the PAL or SECAM systems used for television signal broadcasts in other countries—as appropriate).

Scaling the video portion of a composite signal so that it occupies only a portion of the entire screen raises some problems in maintaining synchronization. The composition of scaled video with computer generated graphics requires that video be digitized and captured. For example, if the video is scaled to one-half its original full screen size, the full time needed to generate an entire field is required to acquire a field of the video image, but only one-half that time is required to display the scaled image in the composite field. Accordingly, an intermediate storage for the video image is required. As shown in FIG. 3 (prior art), current techniques for producing and maintaining synchronization between a scaled video signal and a digital image require a substantial amount of video memory in the form of a random access memory (RAM) ring field buffer 112 that is used for storing full fields of the broadcast signal, which are captured from the broadcast signal input to an NTSC decoder 100. A local oscillator 102 supplies a timing signal to NTSC decoder 100. Appropriate data and synchronization signals generated by decoder in response to the timing signal are supplied to a video capture engine (VCE) 104, to maintain synchronization of each captured video field. On the output side of this system, a local oscillator 110 supplies a timing signal to an NTSC encoder 108.

There are actually two cases that are applicable to this system. In the first case, local oscillator 110 is not synchronized with local oscillator 102; for this case, four fields of digital data produced by capturing images from the broadcast video signal must be stored in the RAM ring field buffer at one time, so that the data for one field can be read from memory as the data for another field are being stored in memory. To form the composite image, the data for one field are read from memory and combined with the digital image produced by the application program, using a compositing module 106. The composite signal is output through NTSC encoder 108. Since local oscillator 102 and local oscillator 110 are not in synchronization, four fields must be stored in RAM ring field buffer 112 to ensure that the captured video data are available when required, to avoid dropping or repeating a frame in the NTSC output signal. In the second case, only two fields must be stored in the RAM ring field buffer to avoid this problem, since the two local oscillators are locked in synchronization. However, in regard to either of these prior art approaches, it should be noted that 196,608 bytes of RAM are required per field stored (i.e., for 640×240 pixel fields in YCrCb 4:2:2 format), which is prohibitively expensive in a set-top box. A lower cost method is thus needed to maintain synchronization between the disparate signals in producing an output signal used to drive the television receiver.

Some applications require that graphics on the screen remain stable when the user changes channels. For example, image stability is particularly important when the composite image includes a scaled window of video surrounded by computer generated graphics, such as an electronic program guide or menu that displays the video signal for different selected channels in a window as the user moves a cursor over the channels listed in the graphical representation of the program guide. Each time that the user thus selects a different channel to be displayed in the window on the image with the cursor, the graphical program guide should remain stable while the video in the window changes. Short term instability of the video in the window is of less concern. Thus, the output video stream input to the television receiver must be asynchronous to the input video stream just after the change in video signals initially occurs, but then must stabilize within a second or two and synchronize with the input signal.

However, other applications require that the image on the television screen become stable as quickly as possible when the user changes channels, such as when watching full-screen video with little or no graphics composited in the output signal to the receiver. To satisfy this requirement, the output video signal must be immediately synchronous with the input video signal.

Yet other applications should preferably avoid slipping (i.e., losing) frames from the input video signal, thus implying that the output video stream also be synchronous with the input video stream. To satisfy these diverse synchronization requirements, the system used to composite signals and control synchronization between the input and output signals must permit selection of an appropriate model meeting the needs of each application running on the set-top box. Currently, no synchronization control of sufficiently low cost is available to meet these requirements.

SUMMARY OF THE INVENTION

In accordance with the present invention, a method is defined for generating a timing signal that is employed for displaying a composite image using a television video signal format, where the composite image includes a video signal and a digital image signal. The method includes the step of providing a local oscillator that is synchronized to a source of the video signal, for capturing successive scan line data of the video signal. The scan line data are scaled, producing scaled scan line data that are stored in a buffer, requiring much less storage than an entire image frame of scan line data. A timing generator produces timing signals used to encode the composite image in an appropriate format enabling the composite image to be displayed. The scaled scan line data stored in the buffer are combined with corresponding scan line data from the digital image to produce composite image line data in which the scaled scan line data appear. A predetermined offset is maintained between timing signals used to capture the video signal and the timing signals used to encode the composite signal.

In one preferred form of the invention, the step of maintaining the predetermined offset preferably comprises the step of adjusting a frequency of the timing generator. Alternatively, a reference value in the timing generator is adjusted to change an offset between the local oscillator and the timing generator.

The method further includes the step of determining a time at which the composite signal is used to begin displaying an output frame, by setting a selected value in a vertical counter in the timing generator. A value from the vertical counter is loaded into an input register used for the video signal, when a timing signal for the video signal indicates that a field should be displayed.

Also, a time mark used for display of a field of the composite signal is preferably offset from a corresponding time mark for a field of the video signal by a predefined number of display lines, to minimize a size of the buffer required for storing the video signal. A maximum number of lines that are stored in the buffer is a function of a scale factor applied to the video signal and a function of the predetermined offset. In one embodiment, an offset in the synchronization between the video signal and the composite signal is reduced by adjusting an output odd register value after each output frame. Alternatively, to synchronize the composite image with the video signal, a value is loaded in a frequency register to vary an output clock used for the composite signal.

Another aspect of the present invention is directed to a system for generating a timing signal used to display a composite image, where the composite image combines a video signal and a digital image signal. The system includes a decoder that is coupled to receive the video signal, producing image data corresponding to the signal. A local oscillator is synchronized to the video signal and is used for producing a timing signal that is coupled to the decoder. A buffer is provided for storing at least one scan line of scaled video data. Further, a video capture engine, coupled to receive the video image data output from the decoder, scales the video image data and stores the resulting scaled data in the buffer. The system is adapted to couple to a source of digital image data. A dynamic composition engine is coupled to the buffer to retrieve scan lines of the scaled data and to the source of digital image data to retrieve digital data for any corresponding scan line. The dynamic composition engine produces a composite scan line that combines the data from the scaled video signal with that from the source of digital image data. An encoder, coupled to the dynamic composition engine, is provided for receiving the composite scan line and encoding the composite scan for output and display. Also, a timing generator produces a timing signal that is coupled to the encoder. Control means, coupled to the local oscillator and to the timing generator, adjust the frequency of the timing generator to maintain a predetermined offset between the timing signals that are input to the decoder and the decoder. Other details of the system are generally consistent with the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3 (prior art) is a block diagram illustrating a known method for combining a video signal with a local graphics signal that employs a ring buffer to store fields;

FIG. 4 is a block diagram of the technique employed by the present invention for combining a video signal with a local graphics signal;

Figure 15A:
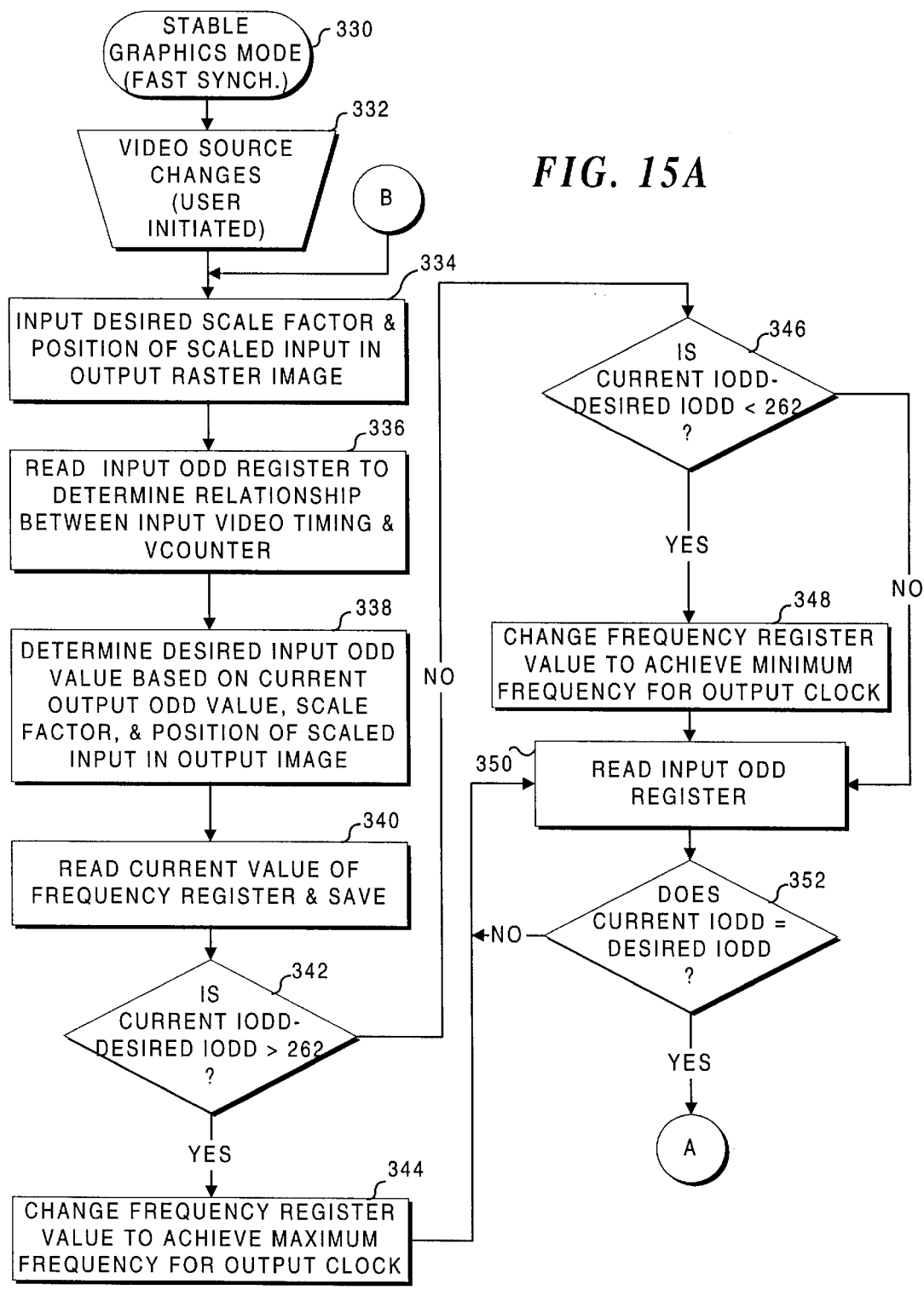
Figure 15B:
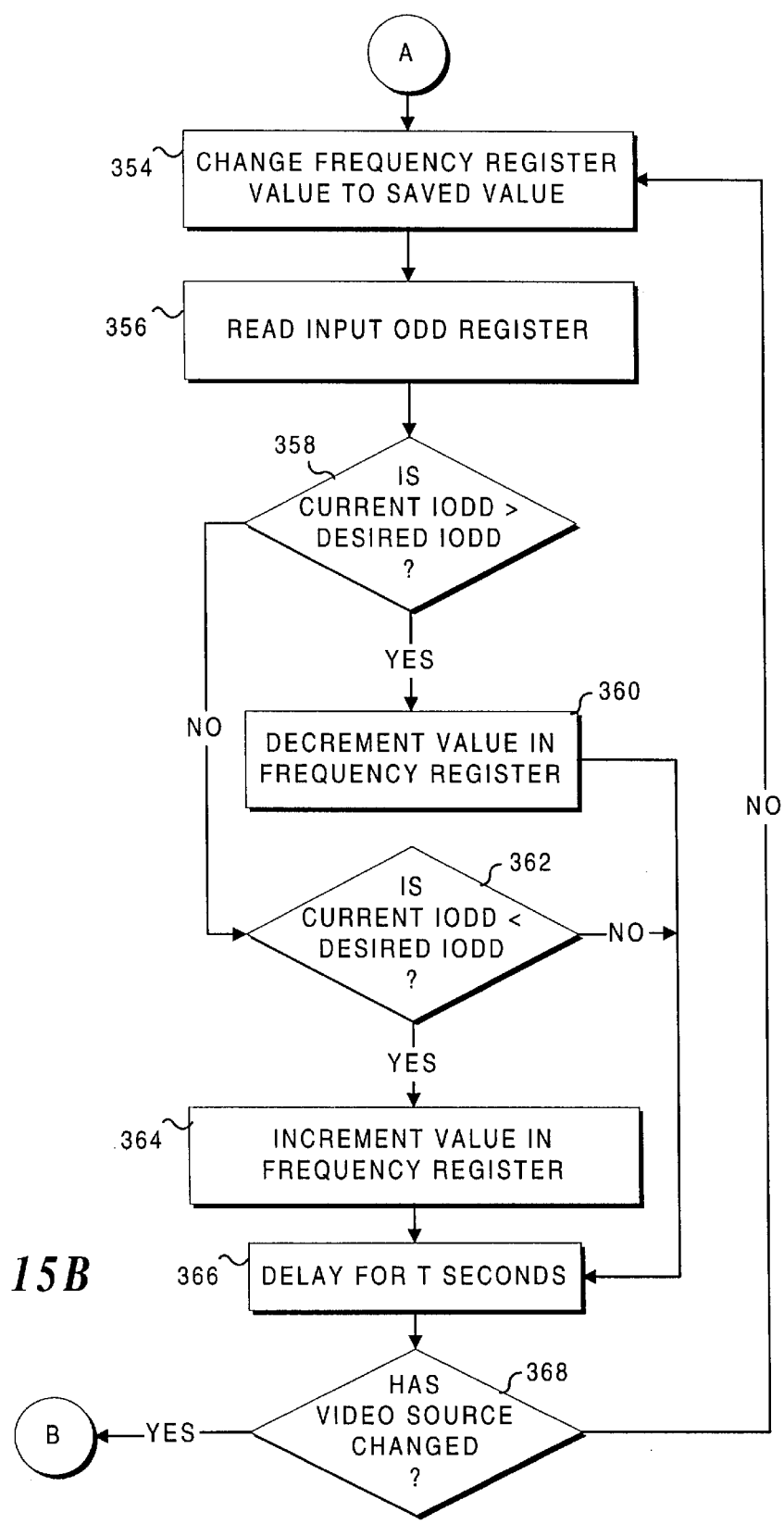
Figure 16A:
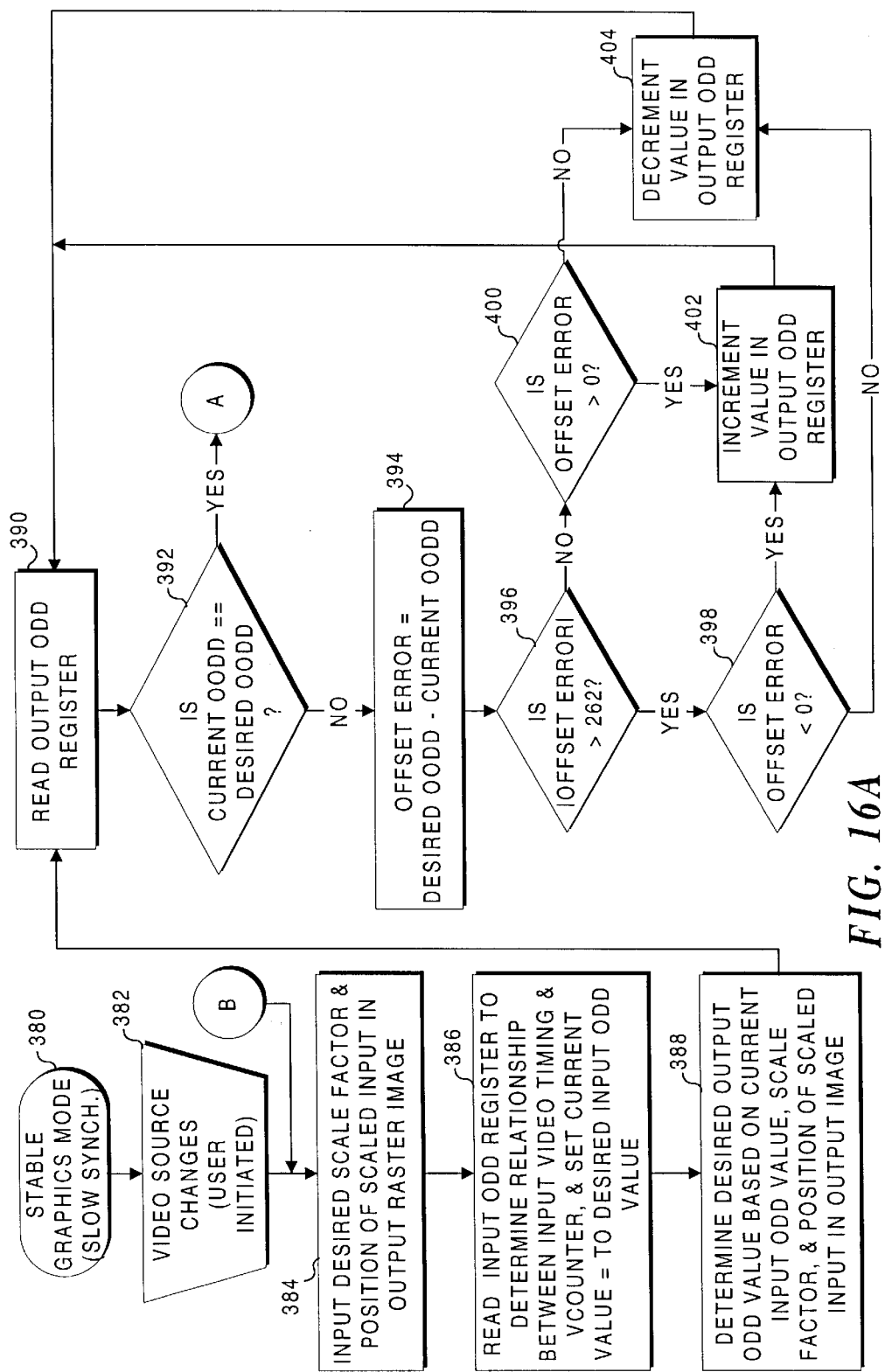
Figure 16B:
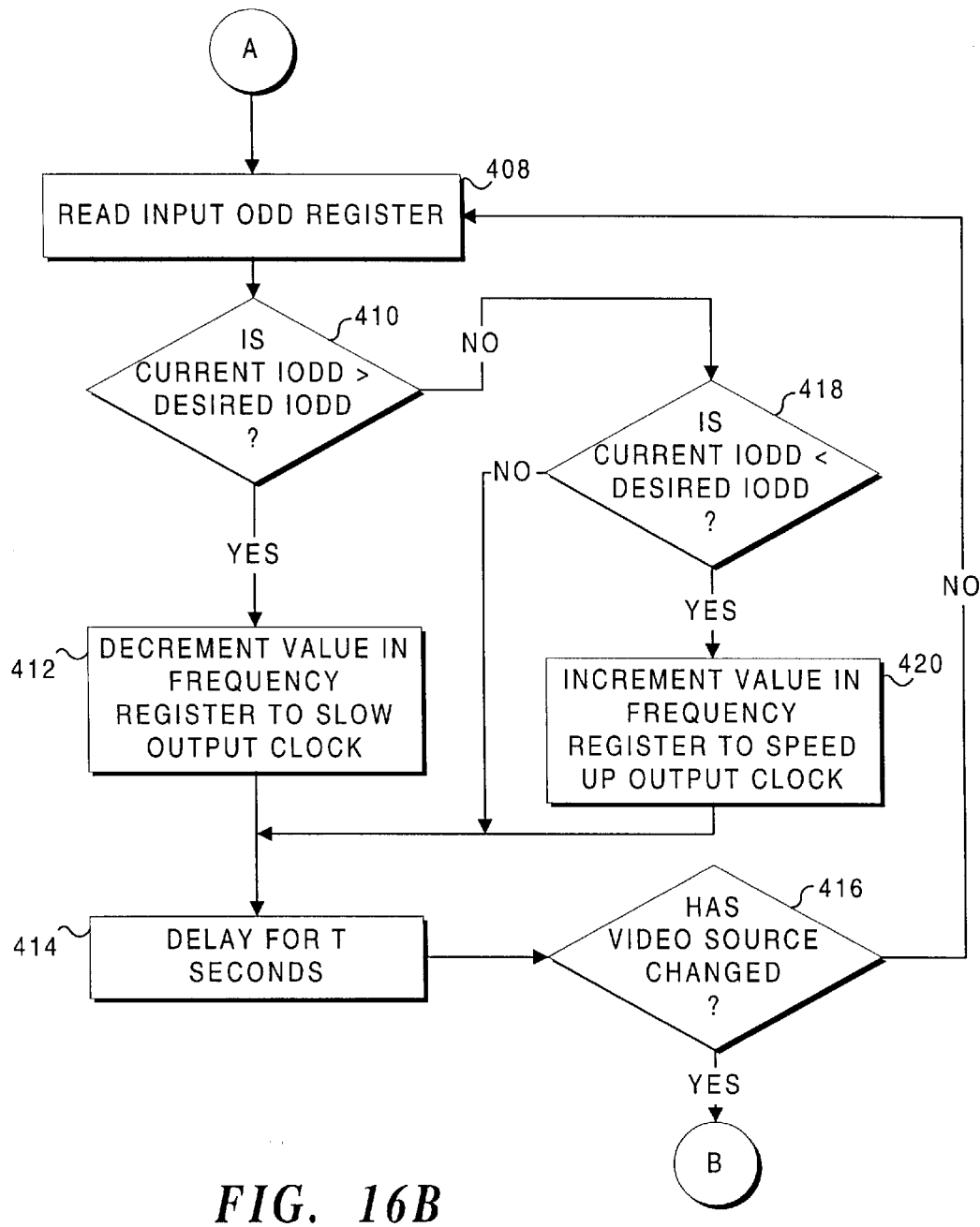

FIGS. 15A and 15B are a flow chart that shows the logic implemented during operation of the system in a stable graphics mode that ensure graphics displayed in a composite image remain stable, while achieving relatively fast synchronization; and FIGS. 16A and 16B are a flow chart illustrating the logical steps effected during operation of the system in a stable graphics mode that is an alternative to that of FIGS. 15A and 15B and adjusts the timing offset more slowly.

DESCRIPTION OF THE PREFERRED EMBODIMENT

Figure 1:
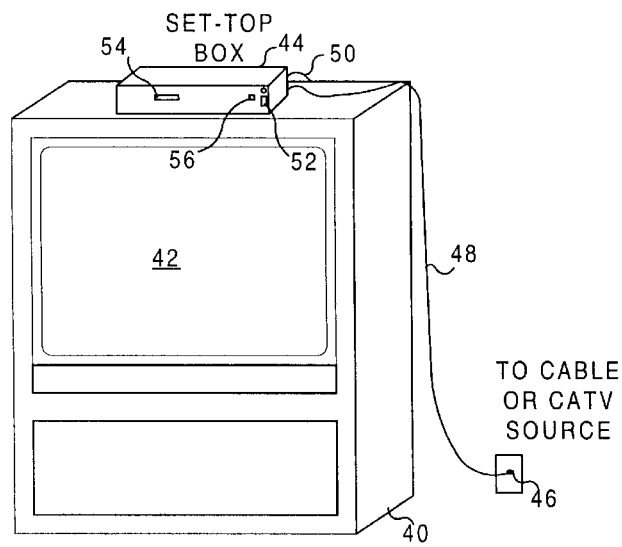
FIG. 1 is a schematic isometric view of a television monitor and of a set-top box that provides an input signal for display on the television monitor.

The present invention is embodied in a set-top box 44, shown in FIG. 1. Set-top box 44 is intended to be used with a television receiver or video monitor 40 having a conventional display screen 42. Although not shown in FIG. 1, it is also contemplated that the set-top box might be used to process signals from several different video sources, such as a laser disc player or VCR, any of which may serve as an video signal source. In addition, the set-top box can be coupled to receive the signal from a rooftop antenna, satellite receiver, a cable system, or a community antenna television (CATV) system, as shown in FIG. 1. Signals can be transmitted from the set-top box over the cable system to a suitable receiver (not shown) at a cable/network facility.

In FIG. 1, a line 48 connects a bi-directional (input/output) terminal (not shown) on the rear panel of set-top box 44 to a corresponding cable outlet 46. A line 50 connects audio and video output terminals (not shown) on the back of the set-top box to corresponding audio and video input terminals (not shown) on the back of television 40. The images produced by set-top box 44 are displayed by television receiver 40 on display screen 42 and may include the images conveyed by a broadcast television signal, a video image produced by the set-top box running a software program, and in accord with the present invention, a composite image produced by combining signals from two or more image sources. Digital images are produced, for example, by circuitry within set-top box 44. These digital images may include (but are not limited to) on-screen menus or dialog boxes generated in response to machine instructions comprising software application programs executed by set-top box 44. Such software applications can be loaded into the memory of the set-top box by inserting a read only memory (ROM) card in a program card slot 54, or could be downloaded via line 48 from a source connected to the cable system.

The set-top box includes a power switch 52 and other controls that are not relevant to the present invention. Also included on the set-top box is an infrared sensor 56 to enable it to receive input signals and commands from a user that are transmitted from an infrared light source contained in a remote control (not shown), which may be used for making selections on the screen with a cursor, just as a mouse controls a cursor on a personal computer.

Figure 2:
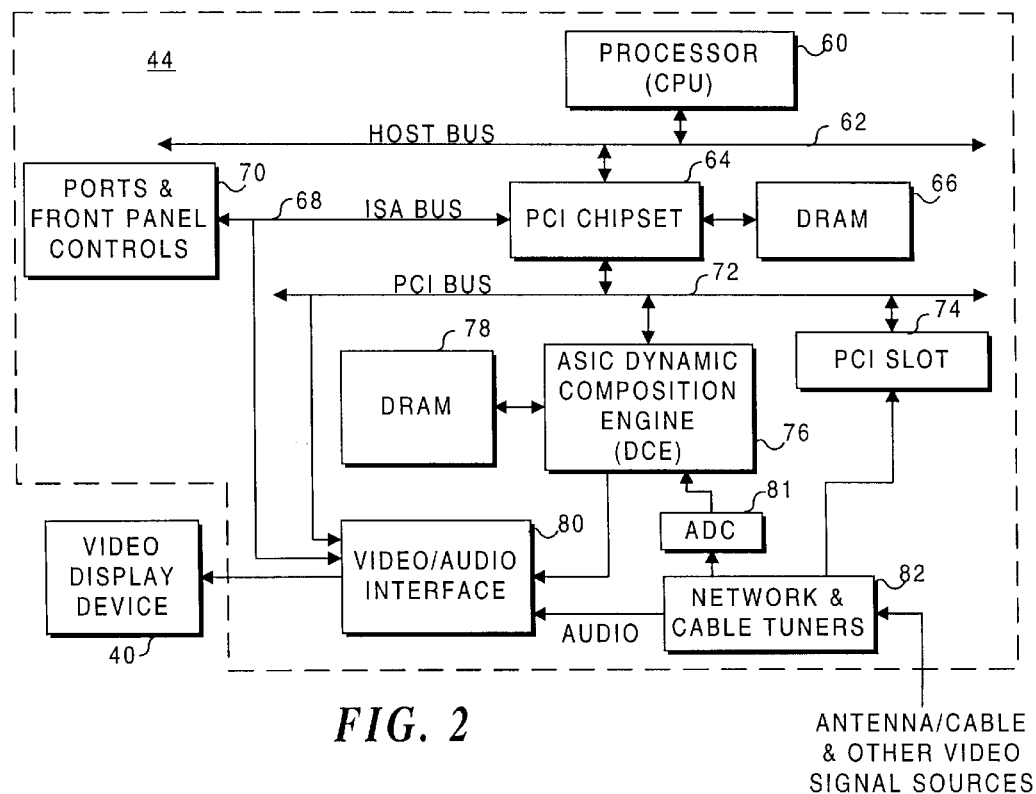
FIG. 2 is a block diagram illustrating the functional components of the set-top box shown in FIG. 1.

Further details of the circuitry within set-top box 44 are shown in FIG. 2. The set-top box is controlled by a central processing unit (CPU) 60. An operating system comprising machine instructions controls the CPU and becomes active when the set-top box is initially energized or reset. The CPU also executes machine instructions comprising application software programs that loaded into it as described above.

CPU 60 is coupled to a host bus 62, which is connected to other components in the set-top box, including a peripheral component interface (PCI) chip set 64. The PCI chip set is commonly provided on personal computers and provides for fast data transfer between the host bus and a PCI bus 72 so that data are moved efficiently between other components of the set-top box and CPU 60. In addition, PCI chip set 64 is coupled to a conventional industry standard architecture (ISA) bus 68 (much slower than the PCI bus) through which are connected input/output ports and set-top box controls, as indicated in a block 70. Dynamic random access memory (DRAM) 66 is also connected to the PCI bus controller, providing volatile storage for data and for machine instructions used to control processor 60.

PCI bus 72 is coupled to a PCI slot 74 and to an application specific integrated circuit (ASIC) dynamic composition engine (DCE) 76. DCE 76 is connected to 16 Mbytes of RAMBUS dynamic random access memory (DRAM) 78. The DRAM is used for storing image data representing objects to be displayed on the display screen of television receiver 40. Network and cable tuners 82 are connected to receive video signals from an antenna, cable, or other source of video signals. Digital data conveyed by the video signals are input to PCI slot 74 and the analog video data are input to an analog-to-digital converter (ADC) 81, which converts the analog signal to a corresponding digital signal for input to DCE 76. The audio portion of the signal input to network and cable tuners 82 are input to a video/audio interface 80, which drives the video display device, i.e., television receiver 40, with an appropriate television broadcast signal format (or if a video monitor is being used in lieu of a convention television receiver, the appropriate video drive signals required by the monitor).

In contrast to the prior art approach disclosed in FIG. 3, which was discussed above in the Background of the Invention, the present invention employs a somewhat different approach for handling synchronization of signals from a broadcast or other type of video source with a composite signal output from the set-top box. The signals from the broadcast or video source are input to a NTSC decoder 100, which converts the image data to a digital format. A local oscillator 102 provides timing signals to the NTSC decoder that maintain it in synchronization with the vertical and horizontal timing signals provided by the video source. The combination video image (pixel) data and timing signals produced by the NTSC decoder are input to a VCE 104 as successive scan lines in first an odd field, and then an even field. VCE 104 handles scaling of the video image data, combining pixels in accord with various known techniques to scale the video image to a desired size in the composite image that will be produced by combining it with a digital image produced by the set-top box or by some other image source, and storing the scaled image data in DRAM 78.

DRAM 78 includes a line buffer 114 for storing scaled lines of video data. Only enough scaled lines of the video data are stored in the line buffer to enable a first line of the scaled video data to be included in the composite image field at the appropriate time. The output of the line buffer is supplied to DCE 76, which combines the digital image scan lines with the scaled video scan lines. The scaled video image appears in a window that normally covers less than the entire frame of the composite image.

An oscillator control 118 coupled to a local oscillator and timing generator 110' works with DCE 76 to control the synchronization of the composite signal with the video signal and the position of the scaled window in the composite image. Oscillator control 118 is also connected to local oscillator 102, so that it receives timing signals for the input video data. Local oscillator and timing generator 110 provides horizontal and vertical timing signals to an NTSC encoder 108 that are adjusted to achieve the desired synchronization between the input video signal and the composite signal that is output from the encoder. Thus, appropriate image data and synchronization signals are input to NTSC encoder 108 in the preferred embodiment, so that the composite image it provides can be displayed on a conventional NTSC television receiver. It is also contemplated that instead of NTSC encoder, other types of television broadcast signal encoders, such as PAL or SECAM can be used in the present invention. Also, the NTSC encoder can supply appropriate signals required by a television monitor instead of those normally input to a television receiver. Oscillator control 118 determines whether the digital image and video signals that are combined in the composite image are rapidly synchronized or are initially asynchronous and more slowly synchronized. As explained above, in the Background of the Invention, it is desirable in some instances to provide for rapid synchronization between the two signals to ensure that the video signal is immediately stable, while in other applications, it is better that the signals briefly remain asynchronous, giving priority to maintaining the stability of the image.

To understand the present invention, it is important to recall that a conventional television receiver displays a frame of interleaved scan lines so that a field of odd numbered scan lines are first drawn on the screen followed by a field of even numbered scan lines. Also, it should be noted that the first twenty-one scan lines in each field are blanking lines that are normally not visible on the television screen. These blanking lines are instead used for conveying other types of data that are not pertinent to the present invention.

Figure 5:
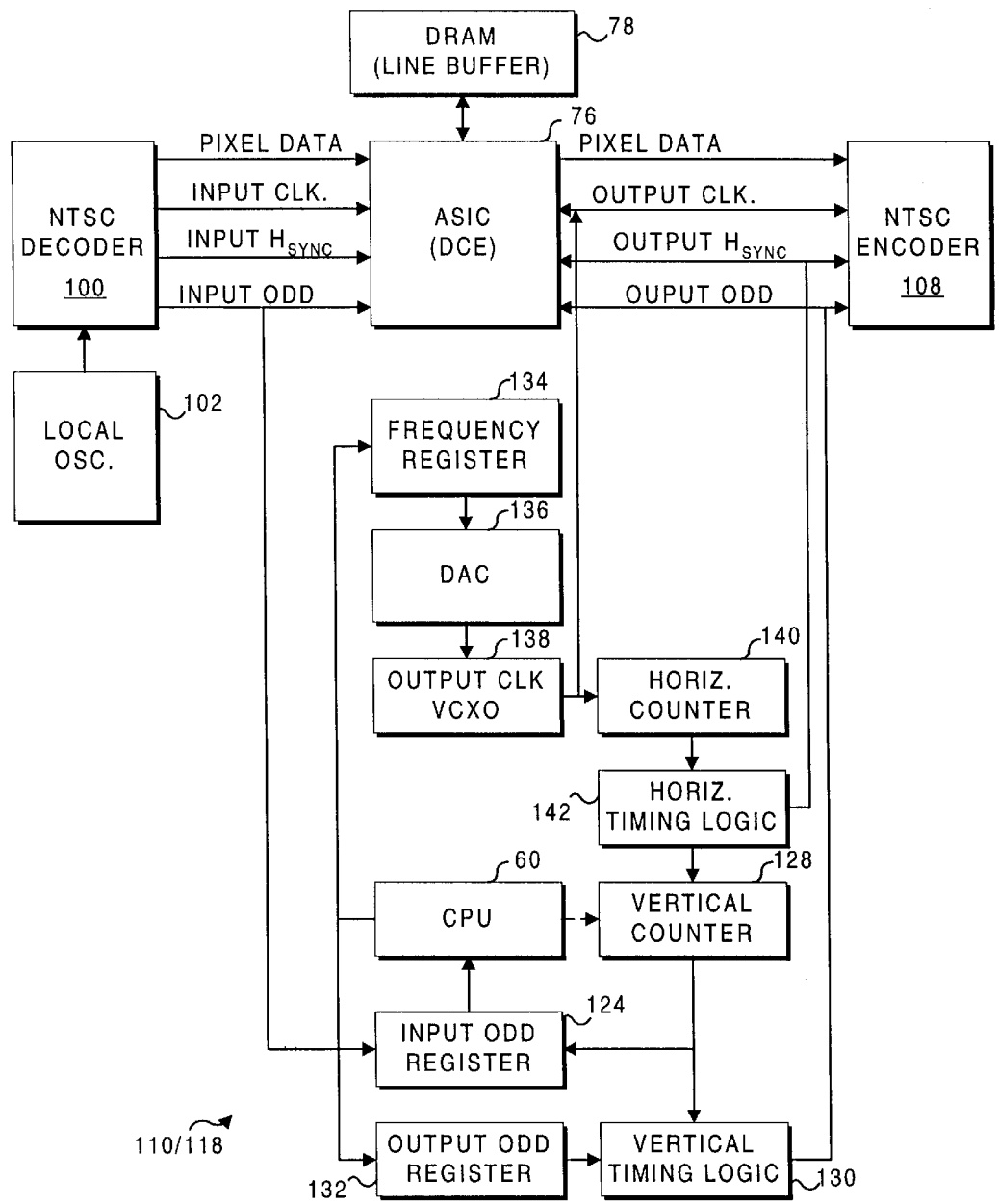
FIG. 5 is a block diagram of the elements of the invention used for controlling synchronization of the input and output video images.

Referring now to FIG. 5, the functional relationship between the components of local oscillator and timing generator 110' and oscillator control 118 are illustrated in connection with their interaction with DCE 76, NTSC decoder 100, and NTSC encoder 108. NTSC decoder 100 provides video data and synchronization (horizontal and vertical timing) data to DCE 76. The video data includes digitized color data for each pixel in successive odd numbered scan lines, followed by the digitized color data for each pixel in successive even numbered lines. The synchronization signals include an input clock signal synchronized to the source of the video data, an input horizontal sync signal, and an input odd vertical sync signal. Since the input odd vertical sync controls the timing for the display of scan lines of an image that start with the first odd scan line, it is identified in the Figure as simply the "INPUT ODD" signal. That signal is also applied to an input odd register 124 in oscillator control 118. The value stored in the input odd register is provided to CPU 60. CPU 60 is connected to an output odd register 132 and to a frequency register 134 and is selectively able to write values to either of those two registers for use in controlling synchronization of the composite video with the input video signal. The value in the output odd register is applied to a vertical timing logic circuit 130, which produces an output odd (vertical) signal that is supplied to DCE 76 and to NTSC encoder 108. Another input to the vertical timing logic circuit is provided by a vertical counter 128. Vertical counter 128 is optionally coupled to CPU 60 and to an (output) horizontal timing logic circuit 142.

The value stored in frequency register 134 is input to a digital-to-analog converter (DAC) 136, which converts the digital value to a corresponding analog signal. In response to the analog signal from DAC 136, an output clock 138, which includes a voltage controlled oscillator (VCXO), produces clock pulses. The frequency of these pulses thus corresponds to the digital value that is applied to the output clock by DAC 136 and therefore, is a function of the value written to frequency register 134. A horizontal counter 140 counts the pulses produced by output clock 138, i.e., pixel pulses, producing a corresponding digital signal that is input to horizontal timing logic circuit 142. In addition to supplying a signal to vertical counter 128, horizontal timing logic block 142 also provides the output horizontal sync signal that is input to both NTSC encoder 108 and to DCE 76. It should be noted that each successive scan line (in the vertical direction) includes a predefined number of pixels that are generated at the rate and time determined by the horizontal timing signal. When the predetermined number of pixels in a scan line are generated, the horizontal timing signal will indicate the start of the next scan line in the odd or even field that is currently being composited. Accordingly, it will be evident that the vertical timing signal is generated as a function of the horizontal timing signal.

Oscillator control 118 is used to achieve the desired synchronization mode between the video signal that is input and the composite output video signal, for a plurality of different applications. One of the more important applications relates to the scaling of the video image in a window included in the composite image. The composite image also includes the digital image in the remainder of the frame outside the window in which the scaled video image data appear. During the generation of the composite image, the oscillator control determines the synchronization of the composite output video stream to the input video stream and controls the relative offset between the start of the output odd and even fields and the input odd and even fields. The term "field" refers to either the even numbered lines comprising an image, or the odd numbered lines.

The oscillator control can serve as a simple GENLOCK device, wherein the output clock is locked in synchronization to the input clock, and the output odd signal is locked in synchronization to the input odd signal. Software executing in the set-top box enforces this relationship by causing CPU 60 to set the value of the output odd register to match the value in the input odd register. If the value in the input odd register changes, the CPU responds by changing the value in the frequency register to adjust the frequency of the output clock. Using this technique, the output video stream is maintained in synchronization with the input video stream. As a result, the amount of memory required for buffering the input video is substantially reduced.

Figure 6:
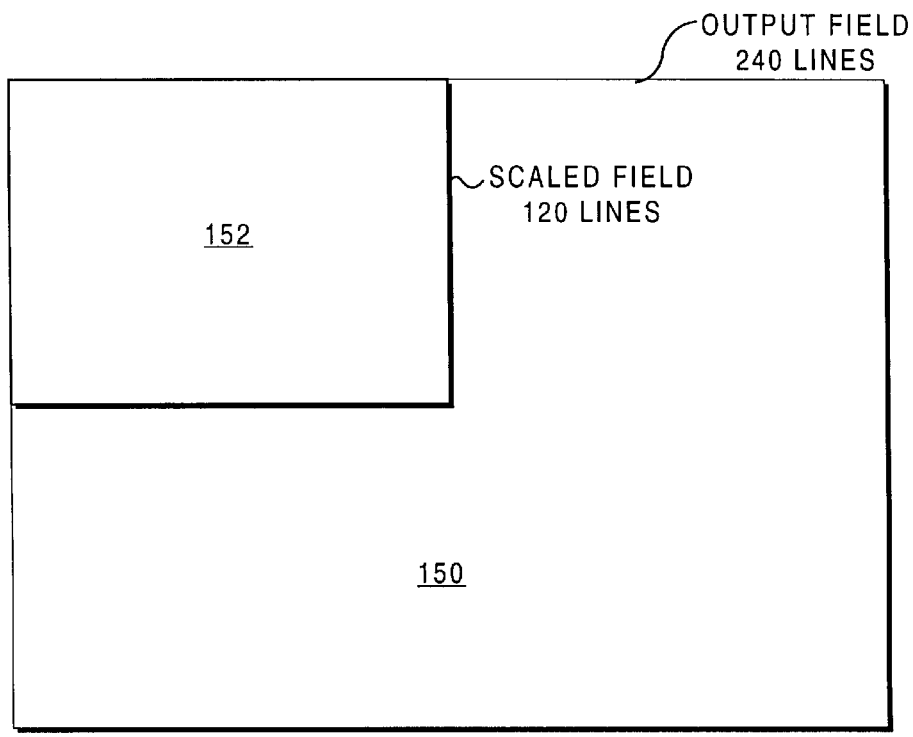
FIG. 6 is a graphic representation showing an input video scaled by one-half and disposed in the upper left corner of a composite image.

An example will help to illustrate the benefits of the approach in the present invention. In FIG. 6, the input video is scaled by a factor of one-half and is displayed in the upper left corner of the composite image. The first visible line of the scaled input signal is displayed concurrently with the first visible line of the output signal at scan line 22. FIG. 6 shows how the resulting scaled field of 120 scan lines in a window 152 occupies the upper left quarter of a composite field 150 of 240 lines. It should be noted that the time required to produce the entire scaled field in window 152 is equal to the time required to produce the complete composite field 150. However, the scaled field is displayed in one-half the time required for the entire composite field. Thus, buffering is required for the scaled video field.

In the preferred embodiment, the line buffer of DRAM 78 is used for storing scaled scan lines of the scaled video field. By treating the line buffer as a circular buffer into which the scaled video scan lines are written by the VCE and from which the DCE fetches the scaled scan lines for creating the composite image, the required lag or offset time is achieved. The output field lags the input field by an appropriate time delay so that the size of this circular buffer is kept relatively small, so long as the output video stream is synchronized with the input video stream. In fact, depending upon the scaling required, the line buffer need not store more than 60 scan lines and is therefore appropriately referred to in the following description as a "microbuffer."

In the example shown in FIG. 6, the start of the output video data stream for the composite image must be offset from start of the input data stream by 120 scan lines, thereby reducing the buffering requirement to 60 scan lines. For a YCrCb or 4:2:2 video image, the required storage in the line buffer of DRAM 78 is thus only 76,800 bytes.

Figure 7:
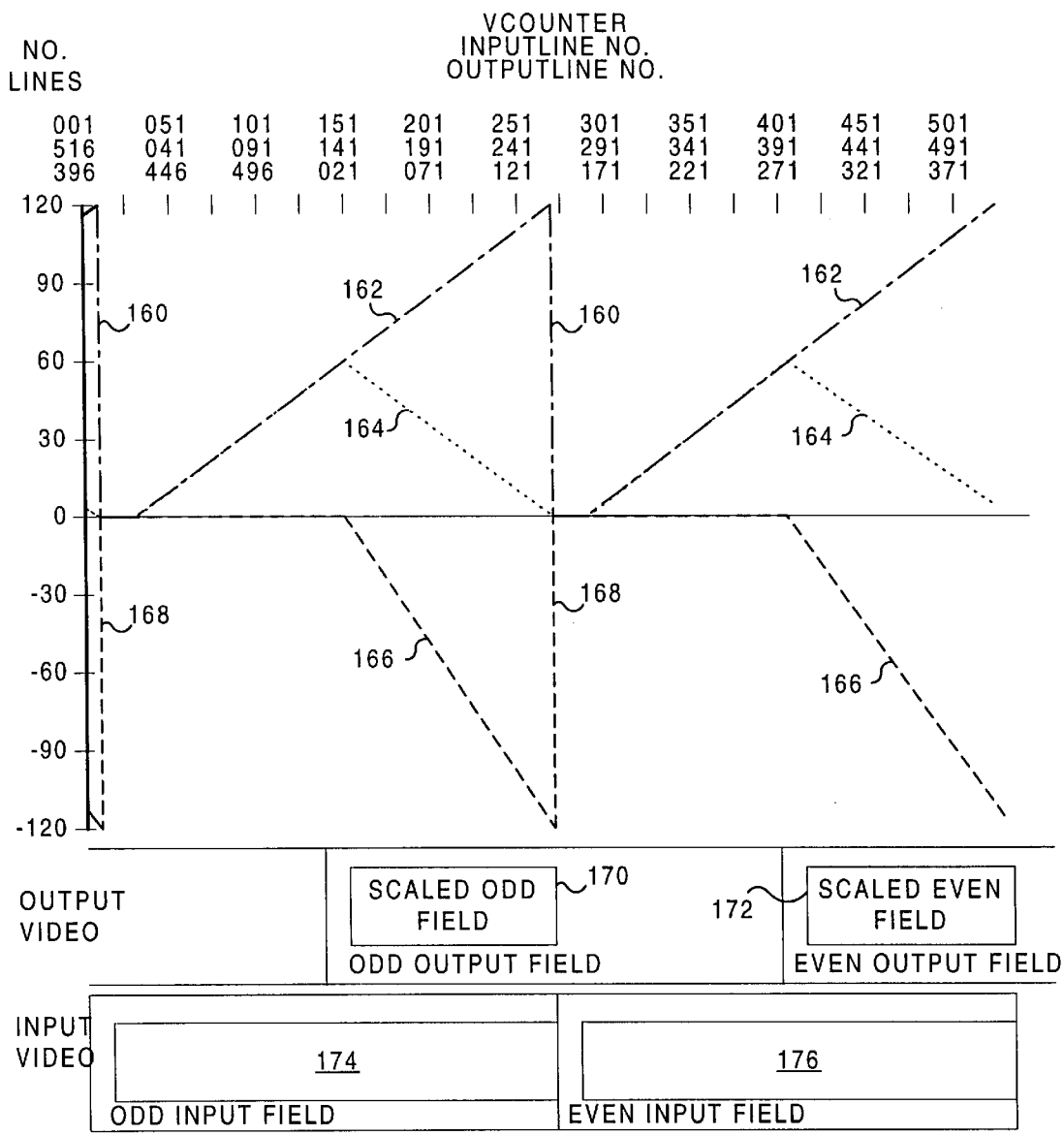
FIG. 7 is a graph showing the line timing relationship between the scan lines that are input, output, and held in the buffer, for the scaling illustrated in FIG. 6.

FIG. 7 illustrates the relationship between the cumulative (scan) lines that are input, the cumulative (scan) lines that are output, and the number of (scan) lines stored in DRAM 78, i.e., in the microbuffer. In FIG. 7, the upper half of the vertical axis on the left side of the graph indicates the number of scan lines in the scaled field, which range between zero and 120. The lower half of the vertical axis ranges between zero and −120, to reflect the fact that as lines are output from the microbuffer, the cumulative number of lines stored in the microbuffer is reduced. Further, in this and the following graphs of FIGS. 9, 11, and 13, dash-dot-dash lines represents the cumulative lines input, dash lines indicate the cumulative lines output, and dotted lines indicate the number of lines occupying the microbuffer, over time. Also in each of these graphs, the scale at the top of the graph defines three values, the top value corresponding to the value in vertical counter 128, the middle value corresponding to the input (scan) line number, and the lower value corresponding to the output (scan) line number. Blocks below the graphs indicate the relationship between the timing of the composite video and the input video.

Since the first 21 lines are not displayed, in FIG. 7, the microbuffer does not begin to fill with scan lines until input line number 21. It should be noted that to improve clarity, the left portion of the graph shows the end of the previous even field. Vertical line 160 goes to zero as the lines input for the next odd field begin to accumulate at a vertical counter value of 10. Similarly, at that point, the cumulative lines output go from −120 to zero, as shown by a vertical dash line 168.

At input line number 23, the microbuffer cumulative occupancy is one line, since the first two video input scan lines are combined to produce the first scaled line. For scaling the input video, different techniques can be used; however, the simplest approach is simply to average the digital color components of adjacent pixels from successive input video scan lines to determine the color components of pixels in each scaled scan line. As successive odd video lines are thus scaled, the number of scan lines occupying the microbuffer continues to increase along the slope of a dash-dot-dash line 162 in FIG. 7 (a dotted line overlies the lower portion of line 162), reaching a maximum of 60 lines when the vertical counter value is equal to 151. Thereafter, as indicated by a dotted line 164, the microbuffer occupancy decreases as each successive scaled scan line is output to generate the composite odd field. Output of the scaled lines is indicated by a dash line 166, which changes from zero, when the microbuffer occupancy is equal to 60 scan lines, to −120, when the microbuffer occupancy is equal to zero. As indicated by a block 170 below the graph, the first line of the scaled odd field is visible in the output composite image when the vertical counter is equal to 152, which corresponds to an output line number of 22. Scaled odd field 170 is completed when the vertical counter value is equal to 271, as evidenced by vertical dash line 168 indicating that the value of cumulative lines output is changing from −120 to zero, and by a vertical dash-dot-dash line 160 indicating that the value of cumulative lines input is changing from 120 to zero. However, the remainder of the scan lines for the composite odd output field is generated until all 240 scan lines in the field generated. Thereafter, the even composite output field begins and the scaled even field is visible, as indicated by a block 172, after 60 scan lines of the scaled even field have accumulated in the microbuffer. Thus, the display of the scaled even field and the visible composite even field begin when the vertical counter value is equal to 415. As the scaled even field is displayed, the accumulated microbuffer occupancy decreases from 60 lines along the slope of dotted line 164, and correspondingly, the cumulative lines output changes from zero to −120 along the slope of dash line 166.

By comparing the time at which the scaled odd field begins to appear in the composite odd field output from NTSC encoder 108 with the time that the visible odd field portion of the input video in block 174 is first input to NTSC decoder 100, it is evident that the microbuffer provides the storage needed to achieve the required offset between the input and output video stream. Thus, the microbuffer enables enough lines of the scaled odd field input from the video source to be stored so that line 1 of the scaled field is available for display when line 1 of the composite image is displayed, and so that line 120 of the scaled field is available when line 120 is displayed.

Figure 8:
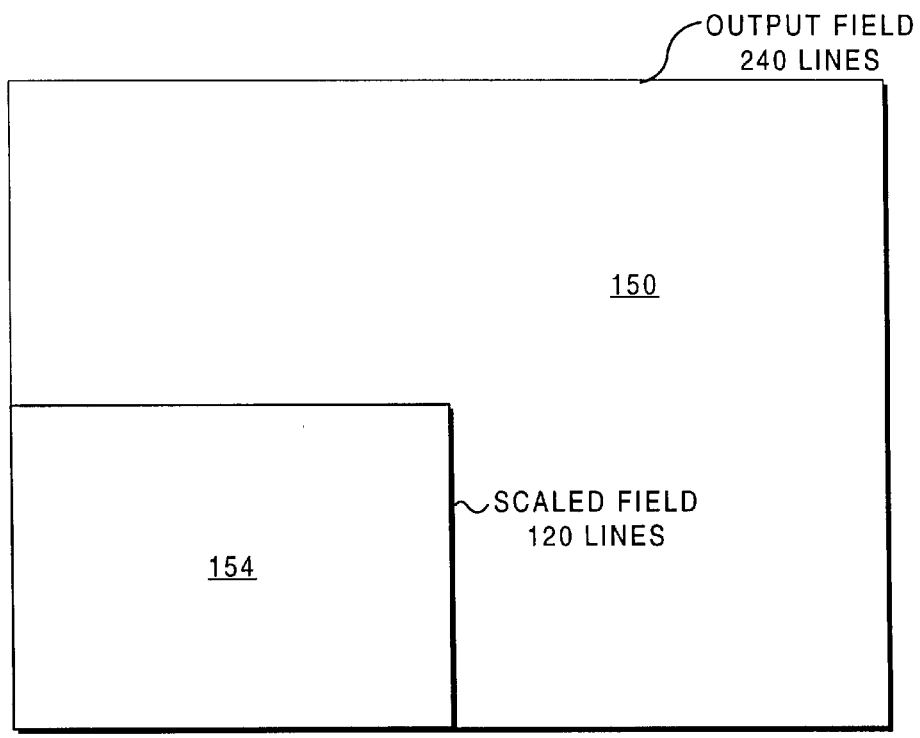
FIG. 8 is a graphic representation showing an input video scaled by one-half and disposed in the lower left corner of a composite image.

In FIG. 8, a second example shows a scaled field of 120 lines in a window 154 disposed at a lower left corner of the 240 lines of composite field 150. Thus, in this example, the same scale factor is applied as in the example shown in FIG. 6, but the location of the scaled window in the composite field is different.

Figure 9:
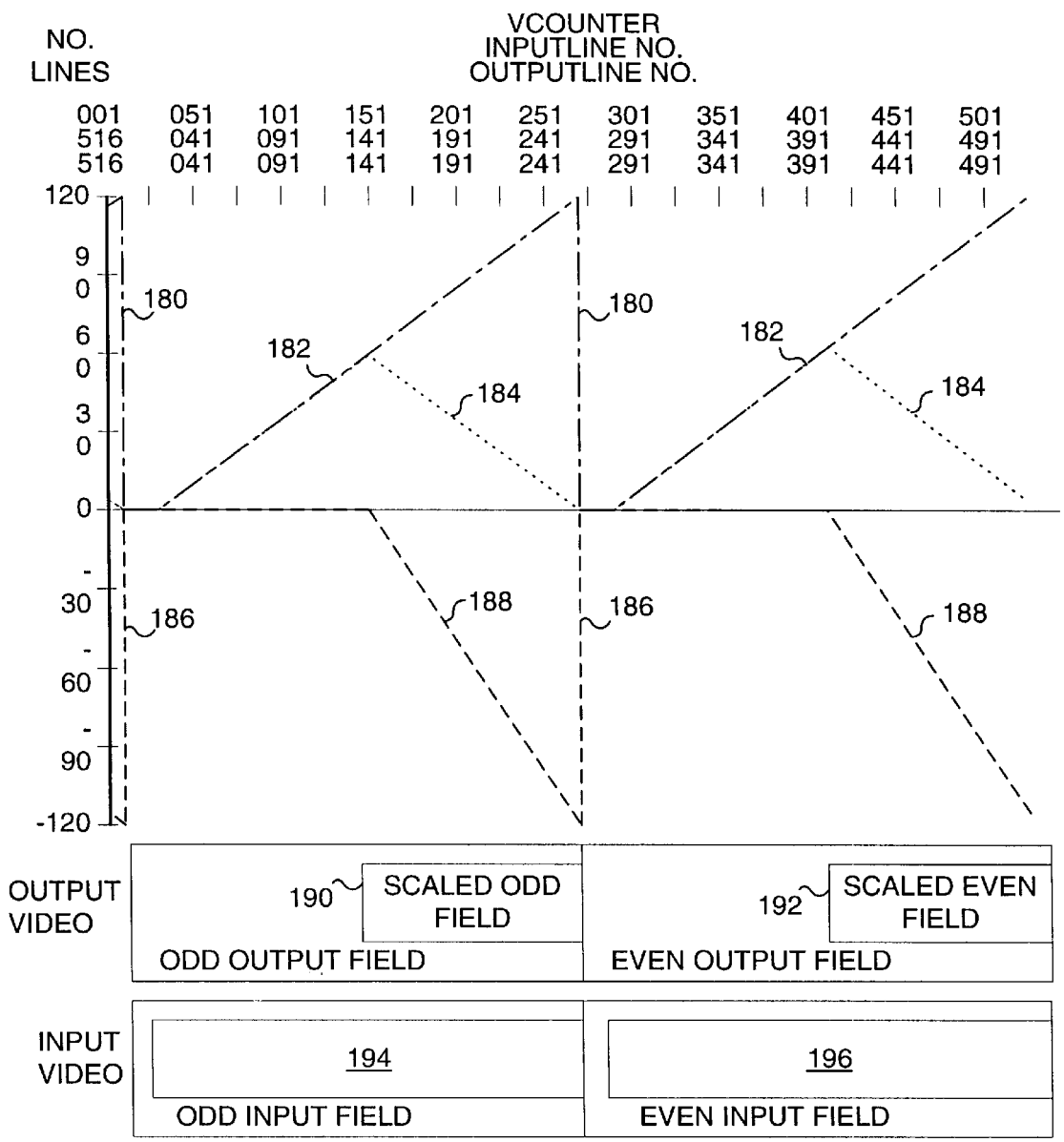
FIG. 9 is a graph showing the line timing relationship between the scan lines that are input, output, and held in the buffer, for the scaling illustrated in FIG. 8.

FIG. 9 illustrates a graph of the cumulative lines input, the cumulative lines output, and the number of lines in the microbuffer, corresponding to the example shown in FIG. 8. Vertical dash-dot-dash lines 180 and vertical dash lines 186 indicate the start of the odd and even output fields for the composite image. It will be noted from blocks 190, 192, 194, and 196 below the graph that the scaled odd field and scaled even field appear in the last half of the corresponding odd and even input and output fields. Thus, the input line number equals the output line number at the top of the graph. Starting at input (or output) line number 22, the cumulative lines input increases from zero to 120 as shown by a dash-dot-dash line 182 for both the odd and even output fields. A maximum of 60 lines are stored in the microbuffer—when the input and output line numbers equal 141. Thereafter, tracking along the slope of a dotted line 184, the microbuffer occupancy decreases to zero. Similarly, the cumulative lines output decreases from zero to −120 at twice the rate, as indicated by the slope of a dash line 188. The relationships between these parameters are identical for both the odd and even fields.

Figure 10:
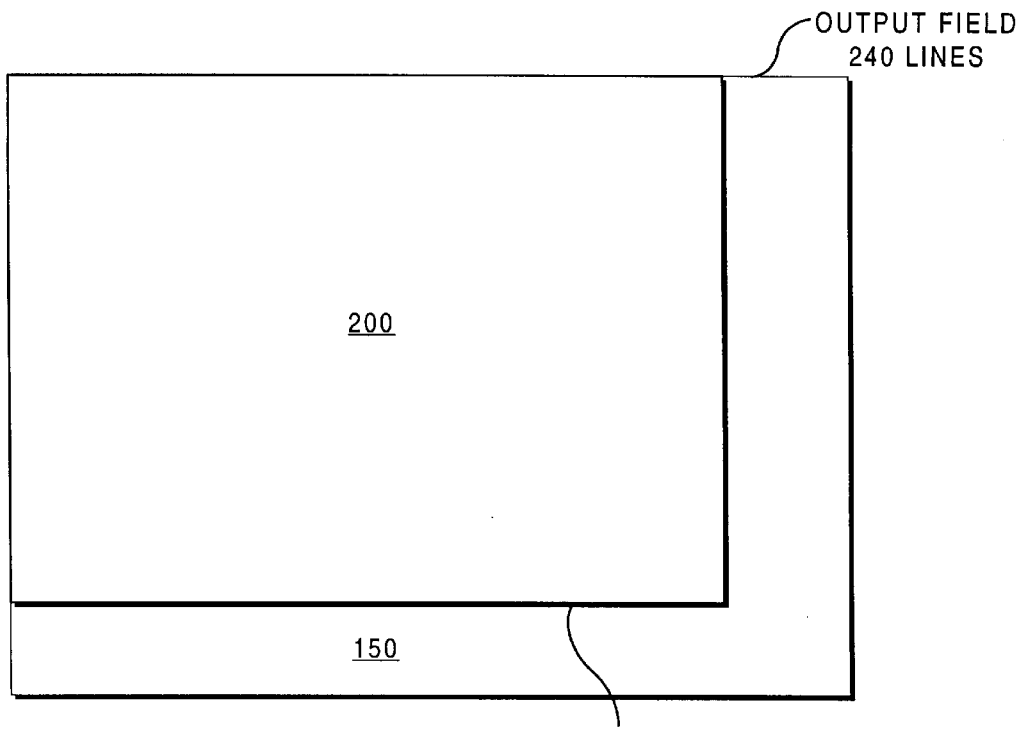
FIG. 10 is a graphic representation showing an input video scaled by 0.8 and disposed in the upper left corner of a composite image.

Referring to FIG. 10, a third example illustrates a scaled field of 192 lines (scale factor of 0.8) appearing in a window 200 in the composite field of 240 lines. In this case, only 48 lines need be stored in the microbuffer to provide the required offset.

Figure 11:
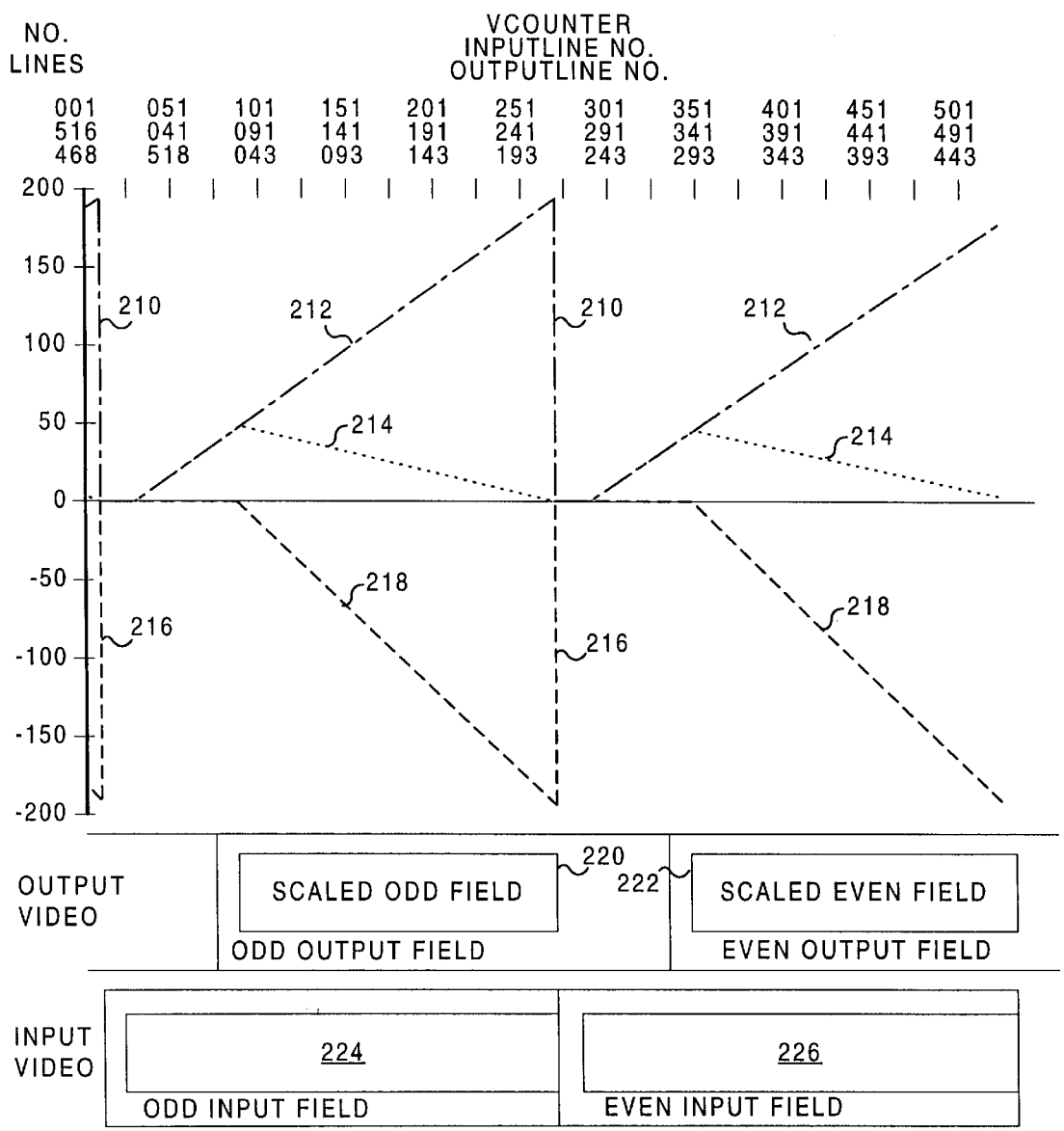
FIG. 11 is a graph showing the line timing relationship between the scan lines that are input, output, and held in the buffer, for the scaling illustrated in FIG. 10.

FIG. 11 illustrates the graphical relationship between the cumulative lines input, cumulative lines output, and the microbuffer occupancy for the scaling relationship shown in FIG. 10. The input line number for the odd input field starts over at a vertical line 210 indicating the change in cumulative lines input from 200 to zero, and for the even input field where the cumulative lines again decreases from 200 to zero at input line number 262. Since the scale factor for this example is equal to 0.8, a maximum of 48 scan lines are accumulated in the microbuffer to provide the required offset between the input image data and the output composite image data. In the graph, the value of cumulative lines input increases along a slope as indicated by a dash-dot-dash lines 212. For the odd output field, the scaled odd field begins appearing in the output video signal as the microbuffer occupancy reaches its maximum value and then begins decreasing along the slope indicated by a dotted line 214. At the same time, the value of the cumulative lines output begins decreasing from zero to −192, as indicated by a dash line 218. The odd and even input fields begin where vertical dash-dot-dash lines 210 and dash lines 216 occur. As shown below the graph, the scaled odd field in a block 220 and scaled even fields in a block 222 are respectively aligned with the ends of an odd input field 224 and an even input field 226.

Figure 12:
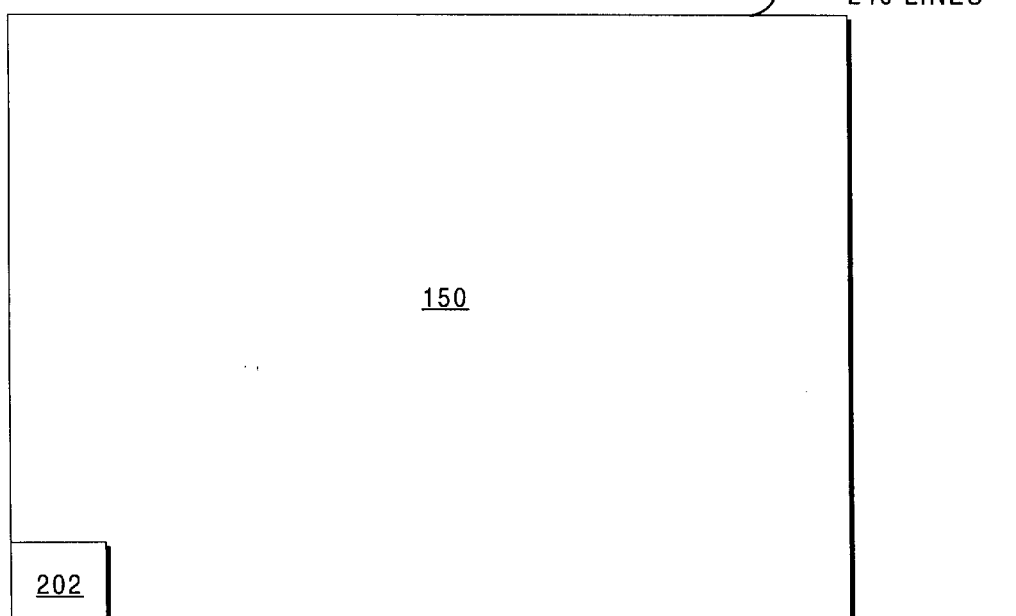
FIG. 12 is a graphic representation showing an input video scaled by 0.2 and disposed in the lower left corner of a composite image.

The final example of scaling is illustrated in FIG. 12. In this example, a scaled field of 48 lines in a window 202 appears in the lower left corner of the composite image, and the field offset is equal to zero lines. The first visible line of the scaled input raster is displayed on line 214 of the output to align the last visible line of the scaled field with the last visible line of the output composite field.

Figure 13:
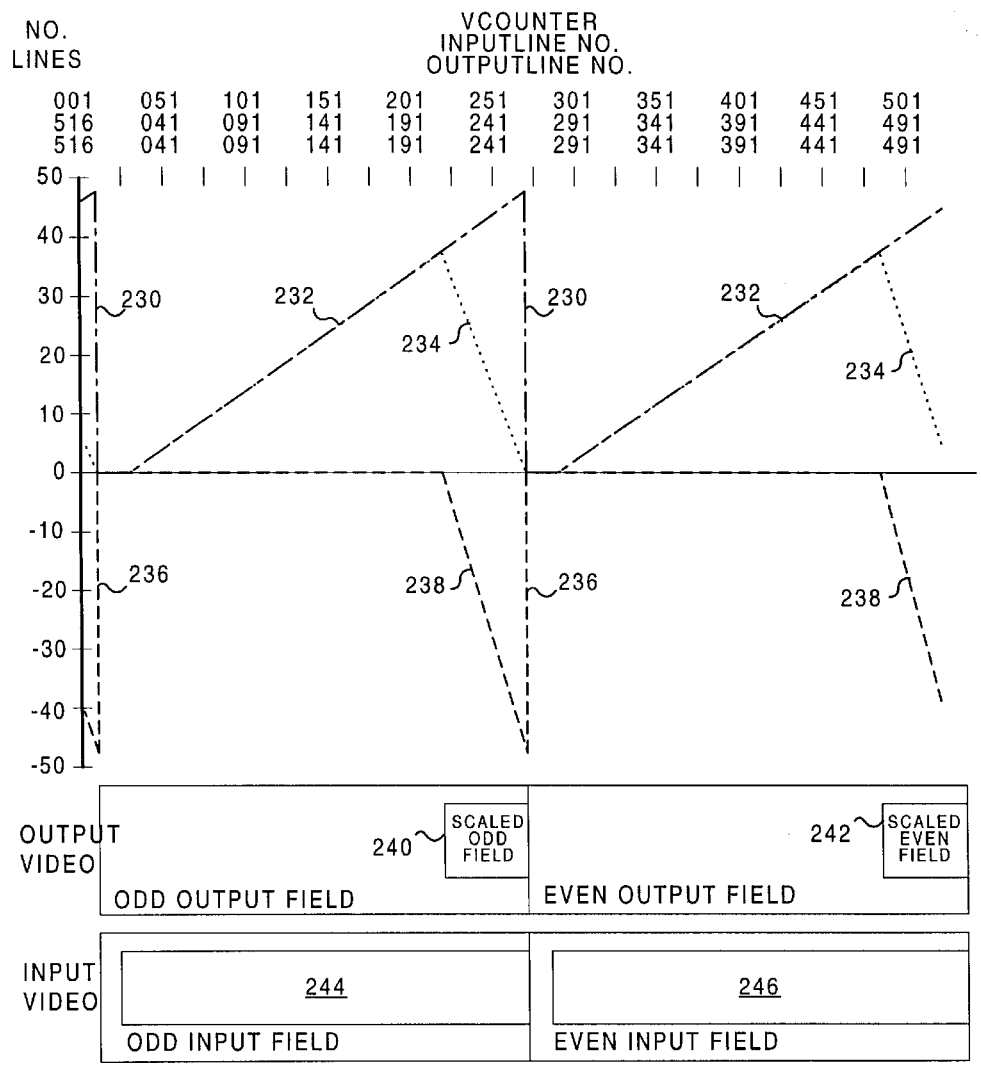
FIG. 13 is a graph showing the line timing relationship between the scan lines that are input, output, and held in the buffer, for the scaling illustrated in FIG. 12.

FIG. 13 graphically illustrates the relationship between the cumulative lines input and output, and the microbuffer occupancy. The odd and even input and output fields both begin at the point where vertical dash-dot-dash lines 230 and vertical dash lines 236 occur. The value of the cumulative lines input rises along a slope defined by a dash-dot-dash line 232, until the microbuffer occupancy reaches a maximum value of only 38.4 lines and then declines along a slope defined by a dotted line 234. Similarly, the cumulative lines output decrease from zero to −48 along a dash line 238. Below the graph, the scaled odd and even fields are indicated in blocks 240 and 242, respectively, relative to the odd and even input fields in blocks 244 and 246.

Figure 14:
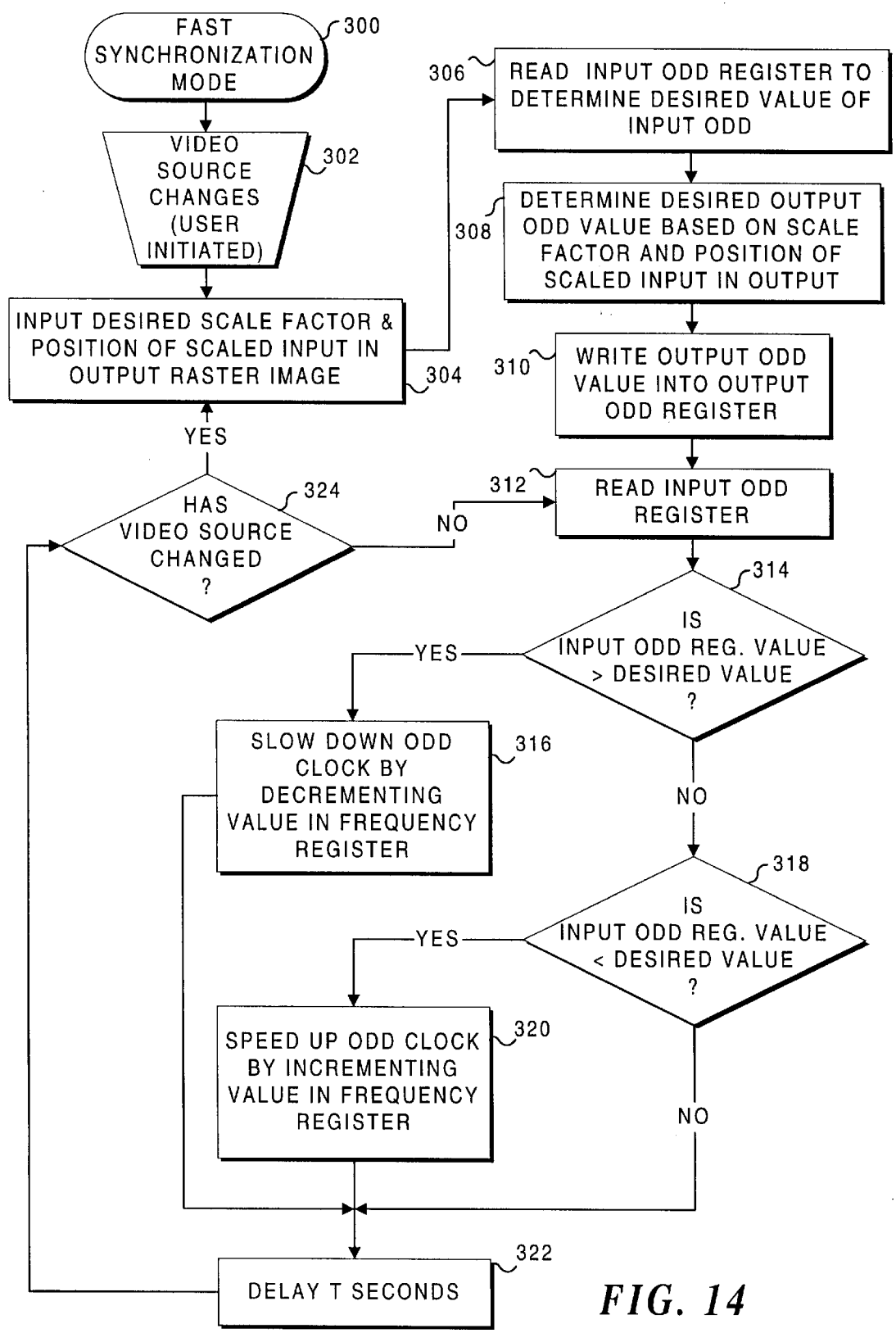
FIG. 14 is a flow chart showing the logical steps implemented in a fast synchronization mode, to achieve fast synchronization between the input and output video signals when the input video signal source is changed.

As explained in the Background of the Invention, certain applications executed by the set-top box require that fast synchronization between the input video signal and the composite output signal be achieved when the input video signal source is changed. The logical steps employed to achieve fast synchronization are illustrated in FIG. 14, starting at a block 300. Typically, the video source changes because the user has initiated a change, for example, by selecting a menu item in the digital graphic portion of a composite image to which an application executed by the set-top box responds. Alternatively, the application may itself initiate the change in the video source. If the video source image suddenly appears in a scaled window in the composite image, it may be important that the scaled video source image in the composite image quickly synchronize to minimize flickering of the scaled video image in the composite image. A block 304 provides for input of the desired scale factor and the position of the scaled input in the output composite (raster) image. This step presumes that the scaled window for the input video source is not already determined for the composite image.

A block 306 reads the value in input odd register 124 (see FIG. 5) to determine a "desired value" for the input odd register, which is used in a subsequent step. Next, as provided in a block 308, the system determines the desired output odd value based on the scale factor and position of the scaled input in the output composite image. This step, which is carried out by CPU 60, involves the mathematical relationships explained below.

The scale factor, S, is a number between zero and one, such that the resulting scaled image is N lines high, where N equals S*240 (assuming the full field includes 240 scan lines). Scan lines enter the microbuffer at a rate of S lines per line time and exit the microbuffer at a rate of one line per line time. Further, the lines begin to exit the microbuffer at a time D, where D is the offset between the input field and the output field in line times. The occupancy, O, of the microbuffer over an interval from zero to D is: O=S*T, where T is the time in line times. Further, the occupancy of the microbuffer over the interval from D to 240 is equal to: O=S*T−(T−D). Thus, the maximum microbuffer occupancy occurs at time D. D may be determined by realizing that the microbuffer is empty at line time 240. Therefore, over the second interval, O=S*T−(T−D)=D−(1−S)*T=0 when T=240. From this relationship, it follows that D=(1−S)*240.

The maximum microbuffer occupancy, M, occurs at time D and is defined by: M=S*D=(S−S$^2$)*240. It is possible to solve for the scale factor, S, that requires the largest microbuffer occupancy using the following equation: dM/dS=(1−2S)*240=0. Therefore, S=½, i.e., the largest microbuffer is required for a scale factor of one-half, at which D is equal to 120 and M is equal to 60 lines. Thus, as noted above, for an image that includes 640 pixel lines in YCrCb 4:2:2 format, the microbuffer must store a maximum of 76,800 bytes.

Under the control of software, CPU 60 creates offset D by writing an appropriate value in output odd register 132 (shown in FIG. 5), when the scaled video is displayed at the top of the frame. The value written to this register should be the value in input odd register 124+120. When a window of scaled input video is displayed at the bottom of the composite output video stream, i.e., so the last visible line of the scaled video window corresponds to the last visible line of the composite image, the value in the output odd register should be identical to that in the input odd register. Therefore, if V is the vertical offset of the scaled video window in the output video image, then the value in the output odd register minus the value in the input odd register should be equal to D−V.

Using conventional NTSC standard line numbering, the value in output odd register should equal the value in input odd register +(1−S)*240+22 minus the output field offset. This value is the line number where the first visible line of the scaled input window is evident in the composite image. From the preceding mathematical relationships, it should be evident how the step in block 308 is implemented.

In a block 310, the output odd value determined in block 308 is immediately written into the output odd register. Next, a block 312 provides for reading the input odd register. A decision block 314 determines if the input odd register value is greater than the desired value for the input odd register, which was determined in block 306. If so, a block 316 provides for slowing down the odd field clock by decrementing the value in frequency register 134. Thereafter, the logic proceeds to a block 322, which delays the process for a time T seconds. While other values may be chosen, in the preferred embodiment, the delay time T is equal to about one second.

Referring back to decision block 314, if the input odd register value is not greater than the desired value, a decision block 318 determines if it is less than the desired value. If so, a block 320 provides for speeding up the odd field clock by incrementing the value in frequency register 134. The logic thereafter proceeds to block 322. Similarly, in decision block 318, if the input odd register value is not less than a desired value, the logic proceeds to block 322. After delaying for T seconds, as provided in block 322, the logic proceeds to a decision block 324, which determines if the video source has again changed either by a user initiated action or under the control of a software application program being executed by the set-top box. If so, the logic loops back to block 304 to repeat the input of the desired scale factor and the position of the scaled input window in the composite output image. However, in decision block 324, if the video source has not changed, the logic loops back to block 312 to read the input odd register. By continually looping through the logic in this manner, the value in the frequency register is changed so that the input odd register value equals the desired value, thereby synchronizing the scaled video in the window of the composite image with the input video. This procedure rapidly achieves synchronization and stability of the scaled video image in the composite image.

For software applications that require that the output display maintain stable graphics even when the input video sources change, it is important that the value in the output odd register not immediately be set to the correct value. Instead, the value should be slewed to the correct value by speeding up or slowing down the output clock by changing the value in frequency register 134. In addition, it is likely desirable to change the value of the output odd register a few lines at a time at the same time that the frequency register value is changed. Since the output odd register value will not be correct for some period of time, the lines filling and emptying from the microbuffer will be out of synchronization and the scaled video will appear to roll within its window. However, the remainder of the graphics display in the background of the composite image will remain stable.

An application that might require stable graphics mode would be one in which the user's attention is focused on the information in the graphic image, while the video in the scaled window is of relatively small size and of lesser importance. For example, if the application running on the set-top box is an electronic program guide wherein the user moves an on-screen cursor among graphical listings of the available channels, while a small video window shows what is currently being broadcast on the channel selected by the cursor, it would be desirable to maintain the graphical information stable, even though the small video window is somewhat less stable immediately after each channel change.

The details for the steps involved in maintaining stable graphics mode while enabling the fastest possible synchronization of the scaled video in a window of a composite image are shown in FIGS. 15A and 15B. From a block 330, the logic proceeds to a block 332 in which it is noted that the video source has changed, typically as a result of the user selecting an option in the graphic image of the composite. A block 334 provides for the input of the desired scale factor and position of the scaled input within the window of the composite image produced by the system. In a block 336, CPU 60 reads the value in the input odd register to determine the relationship between the input video timing and vertical counter 128. A block 338 provides for determining the desired input odd value based on the current output odd value, scale factor, and position of the scaled input in the output image. This step is analogous to block 308 that was implemented in FIG. 14. A block 340 provides for reading the current value of the frequency register and saving it for subsequent use.

In a decision block 342, the CPU determines if the difference between the current value in the input odd register and the desired input odd value is greater than 262. If so, a block 344 provides for changing the frequency register to achieve the maximum frequency for output clock 138. The logic then proceeds to a block 350 to read the input odd register value. However, if the difference between the current value in the input odd register and the desired value is not greater than 262 in decision block 342, the logic proceeds to a decision block 346. This decision block determines if the difference between the current value in the input odd register and the desired value is less than 262. If so, the logic proceeds to a block 348, which changes the frequency register value to achieve the minimum frequency for output clock 138. A negative response to decision block 346 leads to block 350. Similarly, the logic also proceeds to block 350 following the action in block 348. From block 350, the logic proceeds to a decision block 352, which determines if the current value in the input odd register is equal to the desired value. If not, the logic loops back to block 350.

Alternatively, if equality has been achieved between the current and desired input odd register values in decision block 352, the logic proceeds to a block 354 (as indicated in FIG. 15B), to change the frequency register value to its previously saved value. A block 356 then indicates that the CPU reads the value in input odd register 124. Next, a decision block 358 determines if the current value in the input odd register is greater than the desired value. If so, a block 360 provides for decrementing the value in the frequency register. However, a negative response to decision block 358 leads to a decision block 362, which determines if the current value in the input odd register is less than the desired value. If so, a block 364 increments the value in frequency register 134. A negative response to decision block 362 leads to a block 366, as does the flow of logic after block 360 or block 364.

In block 366, the system delays for a time T seconds, which in the preferred embodiment is approximately one second. A decision block 368 determines if the video source has changed, and if so, proceeds to block 334 (in FIG. 15A) to repeat the loop. If not, the logic loops back to block 354, which again changes the frequency register value to its previously saved value. In this way, the appropriate timing offset between the input and output video signals is achieved and the output composite signal is brought into synchronization with the input video signal. For this process, it is assumed that the maximum and minimum values of the odd clock are limited and that the frequency is slewed at a rate such that the NTSC chroma-sub-carrier signal can be synthesized by the NTSC encoder circuitry using the odd clock frequency.

An alternative method can also be used for acquiring the appropriate timing offset. By incrementing or decrementing the value in output odd register 132 after each output frame (i.e., both the even and odd fields) is displayed, the timing offset may be adjusted slowly. Details for the logic implemented in this alternative approach are shown in FIGS. 16A and 16B.

As indicated in a block 380 in FIG. 16A, these steps achieve a stable graphics image, while providing for slower synchronization between the input video and composite output signals. A block 382 indicates that the video source has changed, typically as a result of the user (or software application) effecting some action. A block 384 enables input of the desired scale factor and the position of the scaled video window that will be included in the composite output image. A block 386 reads the input odd register to determine the relationship between the input video timing and the value in vertical counter 128. This step also sets the current value equal to the "desired" input odd value. Next, a block 388 determines the desired output odd value based on the current input odd value, scale factor, and position of the scaled video window in the composite output image, as described above.

A block 390 indicates that the CPU reads the current value in the output odd register. In a decision block 392, the logic determines if the current value of the output odd register is identical to the desired value for the output odd register. If so, the logic proceeds to a block 408 in FIG. 16B, as discussed below. Alternatively, if the result in decision block 392 is negative, a block 394 determines the offset error, which is equal to the difference between the desired and the current value for the output odd register. A decision block 396 determines if the absolute value of the offset error is greater than 262. If so, a decision block 398 determines if the offset error is less than zero. If not, the value in the output odd register is decremented in a block 404. However, if the result in decision block 398 is affirmative, the logic proceeds to a block 402 in which the value in the output odd register is incremented. Referring back to decision block 396, if the absolute value of the offset error is not greater than 262, a decision block 400 determines if the offset value is greater than zero. A positive response leads to block 404, while a negative response leads to block 402. After either blocks 402 or 404, the logic returns to block 390.

Referring to FIG. 16B, in block 408, the input odd register value is read by CPU 60. A decision block 410 determines if the current input odd register value is greater than the desired input odd register value. If so, a block 412 provides for decrementing the value of the frequency register to slow the output clock. The logic then proceeds to a block 414, which delays the procedure for a period T seconds, or about one second in the preferred embodiment. Following block 414, the logic proceeds to a decision block 416. In decision block 416, the logic determines if the video source is changed, and if not, loops back to block 408. From decision block 416, a positive response returns to block 384 (in FIG. 16A).

Referring back to decision block 410, if the current input odd register value is not greater than the desired value, the logic proceeds to a block 418, which determines if the current input odd register value is less than the desired value. If so, a block 420 increments the value in the frequency register to speed up the output clock and then proceeds to block 414. A negative response to decision block 418 also leads to block 414.

From the preceding description, it will be apparent that the present invention permits a scaled video input signal to be composited with a digital graphics signal and the scaled video image to be selectively rapidly synchronized with the input video, or initially displayed in an asynchronous manner and then synchronized with the input video. Depending on the type of application being run on the set-top box in which this invention is embodied, greater priority can be provided to maintaining a stable scaled image when changes in the video source occur, or to maintaining a stable digital graphic image. In either case, a relatively small line buffer is required for storing the scaled data required for the scaled window.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for generating a timing signal used for displaying a composite image using a television broadcast signal format, where the composite image combines a video signal and a digital image signal, comprising the steps of:
   (a) providing a local oscillator that is synchronized to a source of the video signal, for capturing successive scan line data of the video signal;
   (b) scaling the scan line data of the video signal, producing scaled scan line data;
   (c) storing the scaled scan line data in a buffer, said scaled scan line data being substantially less than that required for an entire image frame;
   (d) providing a timing generator that produces timing signals used to encode the composite image in the television broadcast signal format, to enable the composite image to be displayed on a television receiver;
   (e) retrieving the scaled scan line data stored in the buffer;
   (f) combining said scaled scan line data with corresponding scan line data from the digital image to produce composite image line data in which the scaled scan line data appear; and
   (g) maintaining a predetermined offset between input timing signals used to capture the video signal and the timing signals used to encode the composite image.

2. The method of claim 1, wherein the step of maintaining the predetermined offset comprises the step of adjusting a frequency of the timing generator.

3. The method of claim 1, wherein the step of maintaining the predetermined offset comprises the step of adjusting a reference value in the timing generator to change a synchronization between the first and the timing generators.

4. The method of claim 1, further comprising the step of determining a time at which the composite signal is used to begin displaying an output frame, by setting a selected value in a vertical counter in the timing generator.

5. The method of claim 4, further comprising the step of loading a value from the vertical counter into an input register used for the video signal, when a timing signal for the video signal indicates that a field should be displayed.

6. The method of claim 1, further comprising the step of offsetting a time mark used for display of a field of the composite signal from a corresponding time mark for a field of the video signal by a predefined number of display lines, to minimize a size of the buffer required for storing the video signal.

7. The method of claim 1, wherein a maximum number of lines stored in the buffer is a function of a scale factor applied to the video signal and a function of the predetermined offset.

8. The method of claim 1, wherein an offset in the synchronization between the video signal and the composite signal is reduced by adjusting an output odd register value after each output frame.

9. The method of claim 2, wherein the step of adjusting the frequency of the timing generator comprises the step of loading a value in a frequency register to vary an output clock used for the composite signal.

10. A system for generating a timing signal used to display a composite image, where the composite image combines a scaled video signal and a digital image signal, comprising:

(a) a decoder that is coupled to receive the video signal, producing data corresponding to said video signal;

(b) a local oscillator that is synchronized to the video signal, for producing a timing signal coupled to the decoder;

(c) a buffer for storing scaled video data corresponding to at least one scan line of a scaled video frame, but less than a full image frame;

(d) a video capture engine, coupled to receive the video data output from the decoder and to store the scaled video data in the buffer;

(e) a source of digital image data;

(f) a dynamic composition engine that is coupled to the buffer to retrieve the scaled video data for at least one scan line of the scaled video signal and to the source of digital image data to retrieve digital data for any corresponding scan line, to produce a composite scan line that combines the data from the scaled video signal with that from the source of digital image data;

(g) an encoder, coupled to the dynamic composition engine, for receiving the composite scan line and encoding the composite scan line for output and display;

(h) a timing generator for producing a timing signal that is input to the encoder; and (i) control means, coupled to the local oscillator and to the timing generator, for maintaining a predetermined offset between the timing signals that are respectively input to the decoder and the encoder.

11. The system of claim 10, wherein the control means comprise a microprocessor for controlling a frequency of the timing generator to synchronize the video signal with the composite image.

12. The system of claim 11, wherein the control means further comprise a voltage controlled oscillator coupled to a digital-to-analog converter, said microprocessor providing a digital frequency, and said voltage controlled oscillator producing a clock signal that controls a horizontal and a vertical timing signal of the encoder in response to said digital frequency.

13. The system of claim 12, wherein the control means further comprises a digital-to-analog converter that responds to the digital frequency by producing a corresponding analog signal that is input to the voltage controlled oscillator.

14. The system of claim 12, wherein the control means further comprise a horizontal counter that counts the clock signals produced by the voltage controlled oscillator to provide a horizontal reference signal to the encoder.

15. The system of claim 14, wherein the horizontal counter also provides a timing signal used to drive a vertical counter, said vertical counter producing a timing signal input to the encoder.

16. The system of claim 11, wherein the microprocessor maintains the predetermined offset between the timing signals that are input to the decoder and the encoder by adjusting a reference value in a register to change a phase relationship between the first and the timing generators.

17. The system of claim 11, wherein the timing generator includes a vertical counter, and wherein the microprocessor determines a time at which to begin displaying an output frame of the composite image, by setting a selected value in the vertical counter.

18. The system of claim 17, wherein the microprocessor loads a value from the vertical output counter into an input register used for the video signal, when a timing signal for the video signal indicates that a field should be displayed.

19. The system of claim 11, wherein the microprocessor reduces an offset in the synchronization between the video signal and the composite signal by adjusting an output odd register in the timing generator.

20. The system of claim 11, wherein the microprocessor adjusts the frequency of the timing generator by setting a value in a frequency register.

* * * * *